June 7, 1966  S. MALIS ETAL  3,254,808
DEVICE FOR DISPENSING MEASURED QUANTITIES OF LIQUID
Filed July 24, 1964
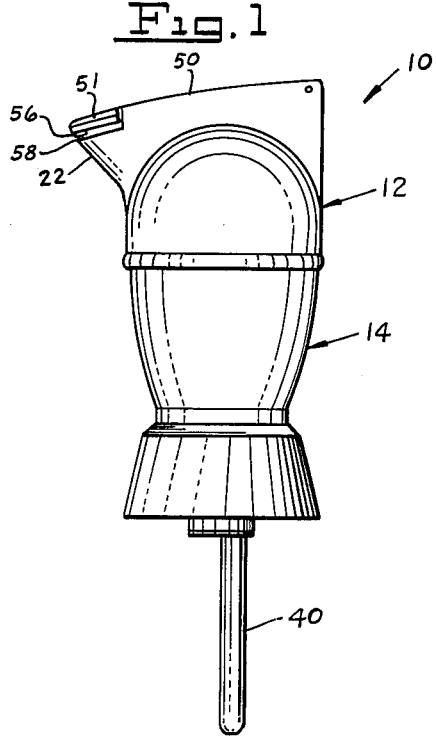
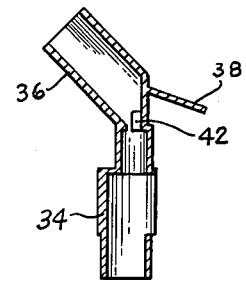
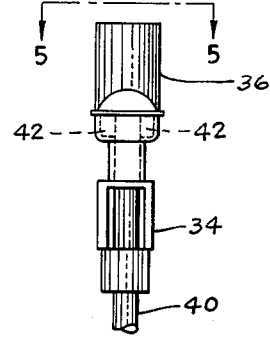
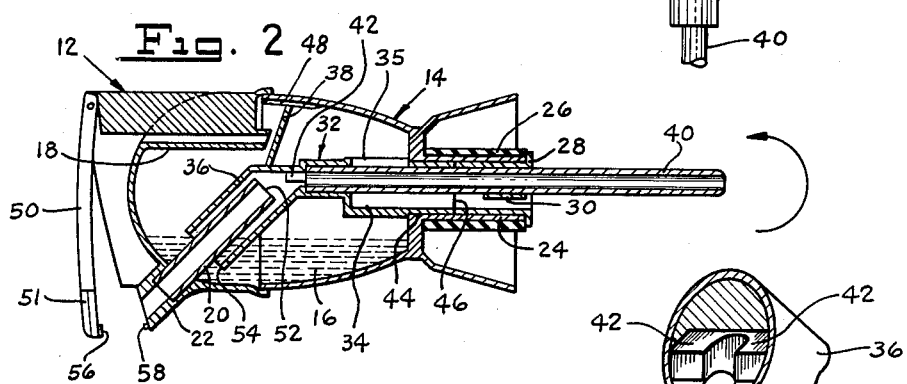
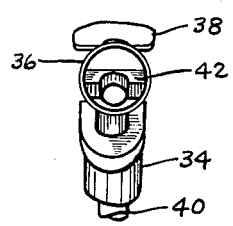
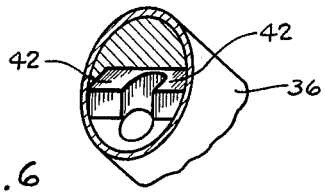
INVENTOR.
SEYMOUR MALIS
MILTON WILENCHIK
BY
ATTORNEY

# United States Patent Office 3,254,808
Patented June 7, 1966

3,254,808
DEVICE FOR DISPENSING MEASURED QUANTITIES OF LIQUID
Seymour Malis, 59 Carnation Road, Levittown, N.Y., and Milton Wilenchik, 21 Maplewood Drive, Plainview, N.Y.
Filed July 24, 1964, Ser. No. 384,858
6 Claims. (Cl. 222—416)

The present invention relates to a device which dispenses a measured amount of liquid from a bottle or similar container.

Present day devices for pouring predetermined servings of liquid have means inserted into the air tubes thereof to prevent the formation of a liquid meniscus at the inner end of said air tube, which meniscus would block the flow of air therethrough and hinder the operation of said device. The liquid dispensing device of the present invention operates in a manner which is completely opposite to that of said present day pouring devices in that it permits the formation of a liquid meniscus at the inner end of the air tube of said dispensing device but simultaneously therewith renders it ineffective to block the flow of air through said air tube.

It is therefore an object of the present invention to provide a liquid dispensing device having a siphon tube which has an air tube inserted therein, the inner end of said air tube being positioned adjacent the inner end of said siphon tube, and located within said inner end of said siphon tube is a bridge-shaped boss whose arcuate inner surface is coextensive with a portion of the inner wall of said air tube; which boss causes the liquid meniscus formed at the inner end of said air tube to be formed in a stretched or expanded condition along said arcuate inner surface thereof, thereby reducing the surface tension of said meniscus and rendering it ineffective to block the flow of air through said air tube, said air flow being sufficient to break said meniscus upon contact therewith.

It is another object of the present invention to provide a liquid dispensing device which may be mounted upon the mouth of a bottle containing a beverage, and more particularly a bottle containing an alcoholic beverage.

It is yet another object of the present invention to provide a liquid dispensing device for repeatedly dispensing a predetermined measured amount of liquid from a bottle, wherein once the bottle has been moved to a pouring position it need not be moved therefrom.

It is a further object of the present invention to provide a liquid dispensing device having a pivotal closure member which substantially seals said device, thereby preventing any contaminants from entering said device when it is not being utilized.

It is yet a further object of the present invention to provide a liquid dispensing device having a pivotal closure member which opens to permit the flow of air through said device into the bottle when said bottle is held in a substantially horizontal position.

It is another object of the present invention to provide a liquid dispensing device having means to prevent said pivotal closure member from sticking to the casing of said device when the device is moved towards the liquid dispensing position.

It is yet a further object of the present invention to provide a liquid dispensing device which is relatively easy to manufacture and assemble and whose cyclic time of operation is less than that of other similar types of liquid dispensers which are presently available.

These and other objects, features and advantages will become more apparent when considered with the following detailed description in conjunction with the accompanying drawings wherein:

FIGURE 1 is a side elevational view of a liquid dispensing device in accordance with the present invention.

FIGURE 2 is a longitudinal sectional view of the liquid dispensing device of FIGURE 1.

FIGURE 3 is a longitudinal sectional view of the inner member of the dispensing device, shown in FIGURE 2.

FIGURE 4 is a top view of the inner member of the liquid dispensing device having an air tube secured therein.

FIGURE 5 is a view taken on the line 5—5 of FIGURE 4 looking downwardly into the upper portion of said inner member.

FIGURE 6 is a partial sectional view depicting the meniscus expanding element of the present invention.

Referring now to the drawings, the liquid dispensing device 10 has a top casing 12 and a bottom casing 14, the top casing 12 being press-fitted in sealed relationship over the bottom casing 14. The casings 12 and 14, when fitted together, form a dispensing chamber 16; said chamber having a vent tube 18 and a pouring tube 20 located therein, said pouring tube being fitted into a pouring spout 22 in said top casing.

Projecting outwardly from the bottom casing 14 is an annular collar 24 having a rubber covering 26 mounted thereon for securing said dispenser within the mouth of a bottle (not shown). An annular sleeve 28 is press-fitted in said collar 24 and holds said covering in place on said collar; said sleeve 28 having a retaining ring 30 formed integrally therewith within said sleeve 28. The sleeve 28 may also be formed integrally with the bottom casing 14.

The inner member 32 includes a filling tube 34, a siphon tube 36 and a baffle 38. An air tube 40 is positionally secured within said member 32 by force-fitting the same therein; the inner end of said air tube being immediately adjacent the inner end of said siphon tube. Located within the inner end of said siphon tube 36 and formed integrally therewith is a bridge-shaped boss 42 (clearly shown in FIGURE 6) whose arcuate inner surface is coextensive with substantially one-half of the inner wall of said air tube; the function of said boss will be described in detail hereinafter.

The inner member 32 is positionally secured with respect to the lower casing 14 by inserting the lower end of said member, having the air tube 40 projecting outwardly therefrom, into an annular opening 44 in said lower casing. The air tube is positionally secured by the retaining ring 30 while the inlet end 46 of said filler tube 34 abuts the inner end of said annular sleeve 28; the outlet end of said filling tube 35 being positioned within and in communication with said dispensing chamber 16. The lower casing 14 has a pair of ridges 48 located at the upper end thereof and the curved outer surface of the baffle 38 (as seen in FIGURE 5) abuts said ridges to positionally secure the upper end of said member 32, and more particularly the siphon tube 36, with respect to said lower casing. The upper casing is positionally secured with respect to said lower casing by placing said siphon tube 36 over said pouring tube 20 and then press-fitting said top casing over said bottom casing; the baffle 38 being positioned adjacent the inlet end of said vent tube 18 to prevent any fluid from exiting therethrough when said bottle is tilted to a pouring position.

In the operation of the dispenser device 10 the bottle (not shown) having said device inserted therein, is tilted counterclockwise to a horizontal position whereby a closure member 50, pivotally connected to said casing 12 at the upper end thereof and having a weighted end portion 51, pivots away from said casing 12 and asumes a substantially vertical position due to the gravitational force exerted thereon. The pivotal movement of said member 50 opens the spout 22 to the atmosphere, whereupon air enters said spout and flows through the pouring tube 20 and said air tube 40 into said bottle, thereby allowing the fluid therein to enter the filling tube 34 via the inlet end 46 thereof, said fluid passing through said filling tube via the outlet 35 thereof and into said dispensing chamber 16; the baffle 38 preventing the fluid from entering the inlet end of said vent tube 18. The bottle is further moved in a counterclockwise direction, as indicated by the arrow in FIGURE 2, until the pouring tube 20 is in a substantially vertical position and the liquid continues to rise within said dispensing chamber until it reaches the top edge 52 of said pouring tube, at which time the siphoning operation commences; i.e., the air flow through said spout 22, said pouring tube 20 and said air tube 40 ceases and liquid flows upwardly through that portion of the siphon tube which surrounds said pouring tube and then downwardly through said pouring tube and said spout. The downward flow dispensing said liquid continues until the level of the liquid reaches the bottom edge 54 of said siphon tube. At this point, air once more enters said air tube 40 through said spout and pouring tube and the cycle is repeated.

In view of the fact that liquid enters the air tube 40, a meniscus is formed at the inner end thereof which would ordinarily hamper the operation of said dispensing device by blocking the air flow through said air tube. However, the bridge-shaped boss 42 acts as an extension of the air tube and causes the meniscus to become stretched or expanded along the arcuate inner surface thereof, thereby reducing the surface tension of said meniscus and rendering it ineffective to block the flow of air through said air tube. At the conclusion of one dispensing cycle and the start of the next cycle, the commencement of air flow is sufficient to break said meniscus upon contact therewith, thereby obviating any difficulties normally encountered by the formation of a liquid meniscus and decreasing the cyclic time of operation for dispensing said measured quantity of liquid.

In order to prevent the pivotal closure member 50 from adhering to the spout 22, when the dispensing device is utilized with a bottle containing a sticky alcoholic beverage, such as a liqueur, the member is provided with a small longitudinal shoulder 56 at the end portion 51 thereof, and the spout 22 is provided with a small transverse shoulder 58, whereby the contact between said closure member and said spout is substantially a point contact. Therefore, any adhering force between said closure member and said spout is easily overcome by the gravitational force exerted upon the weighted end portion 51 of said closure member when the bottle containing said member is tilted to a horizontal position, and the member pivotally moves away from said spout to permit the flow of air into said spout and thereby into said bottle to commence the dispensing operation.

It should be noted herein that the cyclic time of operation of the liquid dispensing device of the present invention, as compared with present day liquid dispensing devices, the quantities of liquid being equal, is approximately 25 percent less, thus dispensing a greater quantity of liquid in the same period of time than that dispensed by said present day devices.

While I have shown and described the preferred embodiments of my invention, there are many modifications which may be made therein without departing from the spirit and scope of the invention as defined by the appended claims.

What is claimed is:

1. A liquid dispensing device for dispensing a predetermined quantity of liquid from a bottle or the like, said dispensing device having a top casing, a bottom casing, means connected to said bottom casing for mounting the dispensing device in the mouth of a bottle, an inner member and an air tube, said inner member having a siphon tube, said air tube being inserted into said inner member whereby the inner end of said air tube is positioned adjacent the inner end of said siphon tube, said bottom casing having a retaining ring through which the outer end of said air tube projects to positionally secure said air tube with respect thereto, said top casing being press-fitted over said bottom casing to form a dispensing chamber, said top casing having a vent tube and pouring spout, a pouring tube having its outer end inserted into said spout and having its inner end projecting into said chamber, the inner end of said vent tube being positioned within said dispensing chamber at a point which is higher than the inner end of said pouring tube when the bottle on which said dispensing device is mounted is tilted to a pouring position, said inner end of said pouring tube projecting into said siphon tube and being encircled thereby, said inner member including a filler tube having an outlet which is in communication with said dispensing chamber, said filler tube providing a passage for the flow of liquid from said bottle to said dispensing chamber when said bottle is tilted to a pouring position, and a bridge-shaped boss in the inlet end of said siphon tube positioned immediately adjacent said inlet end of said air tube for forming an expanded liquid meniscus and concomitantly therewith rendering it ineffective to block the flow of air through said air tube.

2. A liquid dispensing device in accordance with claim 1, wherein said bridge-shaped boss is formed integrally with said siphon tube and has an arcuate inner surface which is coextensive with the inner wall of said air tube, said expanded liquid meniscus being formed along the arcuate inner surface of said boss.

3. A liquid dispensing device in accordance with claim 2, wherein said inner member includes a baffle mounted thereon, said baffle having an arcuate outer surface, said bottom casing having a pair of ridges on the wall thereof, said arcuate outer surface of said baffle being engaged by said ridges to positionally secure said inner member with respect to said lower casing, said baffle being positioned immediately adjacent the inner end of said vent tube to prevent the flow of liquid into said vent tube when said bottle is tilted to a pouring position.

4. A liquid dispensing device in accordance with claim 2, wherein said pivotal closure member has a longitudinal shoulder at the outer end thereof and said spout has a transverse shoulder at the outer edge thereof, said shoulders abutting one another to form a point contact therebetween when said bottle is in a vertical position, and said point contact engagement of said shoulders preventing said closure member from adhering to said spout when said bottle is moved to a pouring position.

5. A liquid dispensing device in accordance with claim 2, wherein said pivotal closure member has a longitudinal shoulder at the outer end thereof and said spout has a transverse shoulder at the outer edge thereof, said shoulders abutting one another forming substantially a point contact therebetween when said device is in an inoperative state, said point contact engagement of said shoulders preventing said closure member from adhering to said spout when said bottle is moved to a horizontal position, thereby commencing the operation of said dispensing device.

6. A liquid dispensing device in accordance with claim 1, wherein said top casing also includes a pivotal closure member for closing said vent tube and said pouring spout when said bottle is kept in a vertical position and said device is in an inoperative state, said closure member preventing any contaminant from entering said device, said closure member pivotally moving away from said spout and vent tube and assuming a vertical position when said bottle is moved to a horizontal position, thereby commencing the operation of said dispensing device, said pivotal closure member having a longitudinal shoulder at the outer end thereof and said spout having a transverse shoulder at the outer edge thereof, said shoulders abutting one another forming substantially a point contact therebetween when said device is in an inoperative state, said point contact engagement of said shoulders preventing said closure member from adhering to said spout when said bottle is moved to a horizontal position, thereby commencing the operation of said dispensing device.

References Cited by the Examiner

UNITED STATES PATENTS

| 2,667,290 | 1/1954 | McPhee | 222—416 |
| 2,678,757 | 5/1954 | McPhee | 222—416 |
| 2,753,090 | 7/1956 | Fay | 222—479 |

RAPHAEL M. LUPO, *Primary Examiner.*

CHARLES R. CARTER, *Examiner.*